US008576566B2

(12) United States Patent
Lev et al.

(10) Patent No.: US 8,576,566 B2
(45) Date of Patent: Nov. 5, 2013

(54) SYSTEMS AND METHOD OF A CARRIER DEVICE FOR PLACEMENT OF THERMAL INTERFACE MATERIALS

(75) Inventors: Jeffrey A. Lev, Tomball, TX (US); Mark S. Tracy, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 13/140,832

(22) PCT Filed: Dec. 29, 2008

(86) PCT No.: PCT/US2008/088474
§ 371 (c)(1),
(2), (4) Date: Jun. 18, 2011

(87) PCT Pub. No.: WO2010/077237
PCT Pub. Date: Jul. 8, 2010

(65) Prior Publication Data
US 2011/0247785 A1  Oct. 13, 2011

(51) Int. Cl.
*H05K 7/20* (2006.01)

(52) U.S. Cl.
USPC .......... 361/704; 165/80.2; 165/185; 361/708; 361/713

(58) Field of Classification Search
USPC .......................................................... 361/708
See application file for complete search history.

(56) References Cited

U.S. PATENT DOCUMENTS

| | | | | | |
|---|---|---|---|---|---|
| 4,612,601 | A | * | 9/1986 | Watari | 361/705 |
| 5,623,394 | A | * | 4/1997 | Sherif et al. | 361/705 |
| 5,796,582 | A | * | 8/1998 | Katchmar | 361/704 |
| 5,819,402 | A | * | 10/1998 | Edwards et al. | 29/840 |
| 6,035,524 | A | | 3/2000 | Suppa et al. | |
| 6,275,381 | B1 | * | 8/2001 | Edwards et al. | 361/717 |
| 6,292,362 | B1 | | 9/2001 | O'Neal et al. | |
| 6,421,217 | B1 | * | 7/2002 | Castonguay et al. | 361/115 |
| 6,552,906 | B2 | * | 4/2003 | Kanada | 361/705 |
| 6,625,026 | B1 | * | 9/2003 | Boudreaux et al. | 361/705 |
| 6,656,770 | B2 | * | 12/2003 | Atwood et al. | 438/118 |
| 6,665,187 | B1 | * | 12/2003 | Alcoe et al. | 361/719 |
| 6,767,756 | B2 | * | 7/2004 | Lee et al. | 438/31 |
| 7,202,111 | B2 | * | 4/2007 | Chiu | 438/122 |
| 7,944,046 | B2 | * | 5/2011 | Chao | 257/713 |
| 2005/0068739 | A1 | | 3/2005 | Arvelo et al. | |
| 2007/0177356 | A1 | | 8/2007 | Panek | |

OTHER PUBLICATIONS

International Searching Authority, International Search Report and Written Opinion, Appln No. PCT/US2008/088474, date of mailing Sep. 18, 2009, 12 p.
Examination Report Under Section 18 (3) received in GB Application No. 1112680.2, mailed Aug. 9, 2013, 4 pgs.

* cited by examiner

*Primary Examiner* — Gregory Thompson

(57) ABSTRACT

Carrier device for placement of thermal interface materials. At least some embodiments are systems including a first electrical component that defines a first surface at a first elevation relative to an underlying structure, a second electrical component that defines a second surface at a second elevation relative to the underlying structure, a metallic member configured to conduct heat from the electrical components, and a carrier between the electrical components and the metallic member. The carrier includes a third and fourth surface configured to mate with the first and second surfaces, respectively, a first aperture through the third surface, and a second aperture through the fourth surface. The system further includes a first thermal interface material coupled between the first electrical component and the metallic member through the first aperture, and a second thermal interface material coupled between the second electrical component and the metallic member through the second aperture.

14 Claims, 3 Drawing Sheets

US 8,576,566 B2

SYSTEMS AND METHOD OF A CARRIER DEVICE FOR PLACEMENT OF THERMAL INTERFACE MATERIALS

BACKGROUND

Many electrical components in computer systems utilize heat transfer devices to assist in keeping the electrical components cool. For example, a main processor in a notebook computer system may use a heat transfer device to conduct heat away from the main processor to a location where the heat is discharged (e.g., a fan near an edge of the notebook). As yet another example, several electrical components of a graphics board may also utilize such heat transfer devices. However, thermally coupling heat generating electrical components to heat transfer devices is complicated when a plurality of such electrical components, such as electrical components on a graphics board, have differing heights above the underlying circuit board.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Thermal interface material" shall mean materials to improve thermal conduction between a heat generating component closely spaced (5 milli-meters or less) to a device configured to conduct heat away from the heat generating component. Thermal interface materials comprise not only sheet- or pad-type thermal interface material, but also materials that are gel-like at room temperature (e.g., thermal grease), and phase-change materials that are solid or semi-solid at room temperature and become gel-like at operating temperature.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
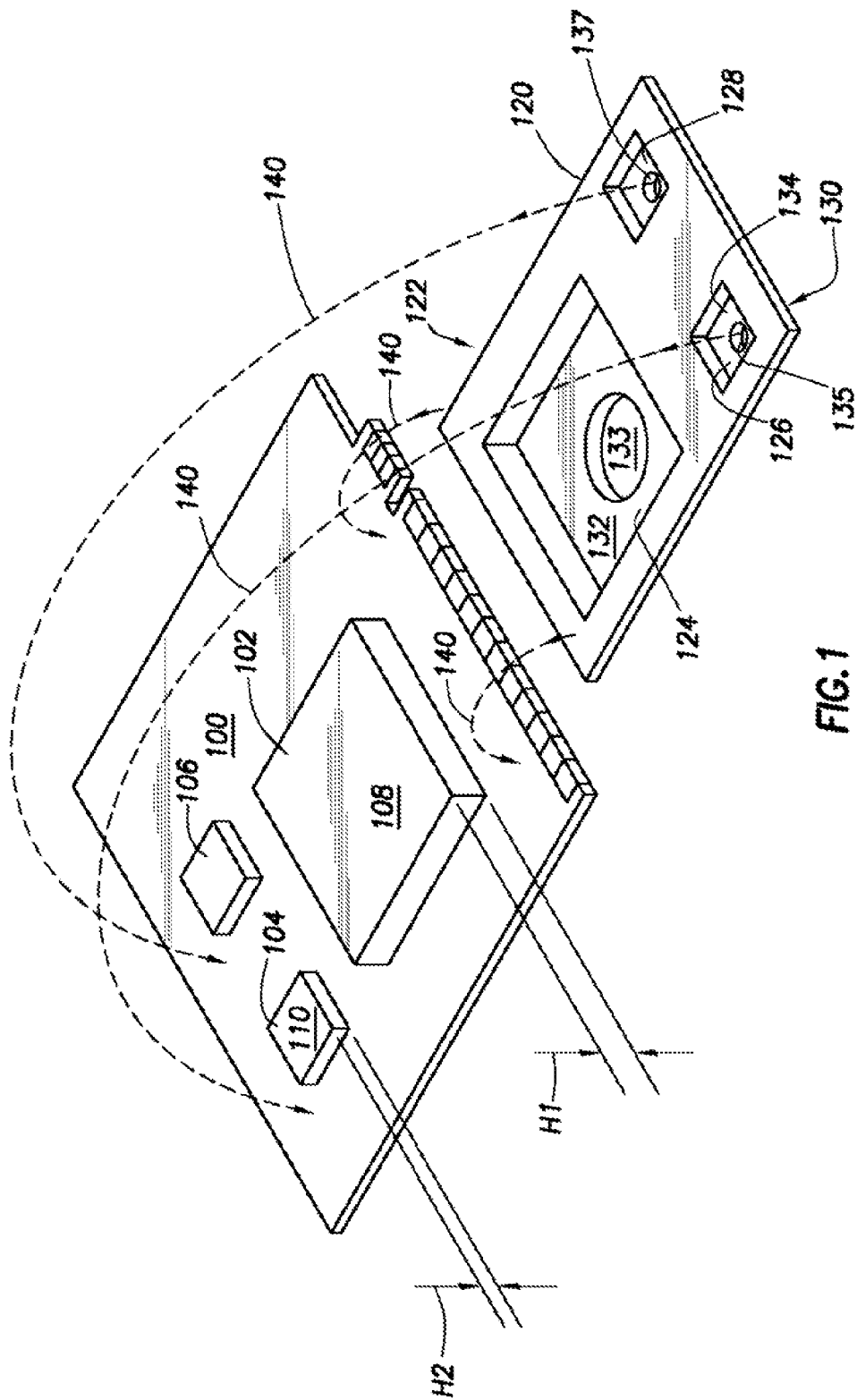
FIG. 1 shows a perspective view of a system in accordance with at least some embodiments.

FIG. 1 illustrates various components of a system in accordance with at least some embodiments. In particular, FIG. 1 shows an underlying structure 100, in the illustrative form of a printed circuit board, having a plurality of heat generating electrical components 102, 104 and 106 mounted thereon. While only three heat generating electrical components are shown, the various embodiments may find use on systems having two or more such heat generating electrical components. The underlying structure 100 and electrical components may form, for example, a graphics card or module configured for insertion into a computer system. In the illustrative case of a graphics module, the electrical component 102 may be a graphics processing unit (GPU), and the electrical components 104 and 106 may be devices supporting the graphics operations. In yet still other embodiments, the structure 100 may be a motherboard, and electrical component 102 may be a main processor.

Regardless of the precise nature of the system of FIG. 1, FIG. 1 illustrates that heat generating electrical components may have differing heights or elevations above the underlying structure 100. For example, electrical component 102 has an upper surface 108 that defines a plane, and the plane defined by the surface 108 has a height "H1" above the underlying structure 100. Likewise, electrical component 104 has an upper surface 110 that defines a plane, and the plane defined by the surface 110 has a height "H2" above the underlying structure 100. As illustrated, H1 is greater than H2. Similarly, electrical component 106 has an upper surface with respective height (not specifically delineated) which may be different than both H1 and H2.

The differing height of the illustrative heat generating electrical components 102, 104 and 106 complicates coupling the components to a thermal solution. As will be discussed with respect to FIG. 2, in at least some embodiments the thermal solution in the form of a metallic member may have a non-uniform attachment surface to compensate, at least to some extent, for the differences in height; however, in addition to or in place of the non-uniform attachment surface for the metallic member, thermal interface material may be used in association with each heat generating electrical component. In particular, manufactures such as 3M of St. Paul, Minn., produce thermal interface materials in the form of thermally conductive interface pads or sheets. The pads or sheets are designed to be compressed between two devices and conduct heat between the two devices. Other thermal interface materials, known as phase change materials, are solid or semi-solid at room temperature, but change phase at operating temperature, and in the changed phase state may act, thermally, similar to thermally conductive greases.

In accordance with the various embodiments, the thermal interface material associated with at least some of the heat generating electrical components is positioned by means of a carrier device. Still referring to FIG. 1, an illustrative carrier device 120 is shown. In particular, in the perspective view of FIG. 1 the carrier device 120 is "turned over" such that the inner surface 122 is visible in the figure. As illustrated in FIG. 1, the inner surface 122 has a plurality of quadrilateral areas that correspond to the heat generating electrical components. More particularly still, the quadrilateral areas 124, 126 and 128 correspond to the electrical components 102, 104 and 106. Stated otherwise, the inner surface 122 is an at least partial negative of at least some of the heat generating components on the structure 100. Each quadrilateral area 124, 126 and 128 is configured to at least partially telescope over its respective electrical component. Moreover, each quadrilateral area 124, 126 and 128 takes into account the height of its respective electrical components. For example, quadrilateral area 124 has a surface 132 that defines a plane. Likewise, quadrilateral area 126 has a surface 134 that defines a plane, and while the plane defined by surface 132 is parallel to the plane defined by surface 134, the respective planes defines are not co-planer. The differences in elevation between the planes are a function of differences in height of electronic components to which the carrier device will attach.

In accordance with the various embodiments, the thermal interface material used in conjunction with each heat generating electrical component 102, 104 and 106 is initially coupled to the carrier device 120. The thermal interface material is not shown in FIG. 1 so as not to unduly complicate the figure, but the various embodiments for placement of the thermal interface material on the carrier device are discussed with respect to FIG. 5. Still referring to FIG. 1, the carrier device 120 (and coupled thermal interlace material) is positioned in mating relationship with the electrical components 102, 104 and 106, as indicated by dashed lines 140. By placing the carrier device 120 in mating relationship with the electrical components, each individual thermal interface material is likewise placed proximate to or in contact with a respective electrical component. In order for the thermal interface material to transfer heat to one or more heat transfer devices proximate to the outer surface 130 of the carrier device 120, each of the quadrilateral areas 124, 126 and 128 comprises an aperture 133, 135 and 137, respectively, between the inner surface 122 and the outer surface 130. While each quadrilateral area is illustrated to have a single aperture, one or more apertures may be equivalently used.

The carrier device 120 in accordance with the various embodiments is constructed of a rigid material, such as polycarbonate. In the case of the carrier device being made of plastics such as polycarbonate, the carrier device 120 may be constructed using a vacuum forming process over a mold that is similar in form to the placement and shape of the electronic components 102, 104 and 106 on the structure 100. However, other mechanisms for creating the carrier device, such as injection molding, computer controlled milling, and die stamping (e.g., in the case of metallic carrier devices), may be equivalently used. Regardless of the precise mechanism used for creation of the carrier device 120, a plurality of carrier devices made in a uniform manner will be structurally consistent, thus ensuring consisting placement of thermal interface materials when using carrier devices.

Figure 2:
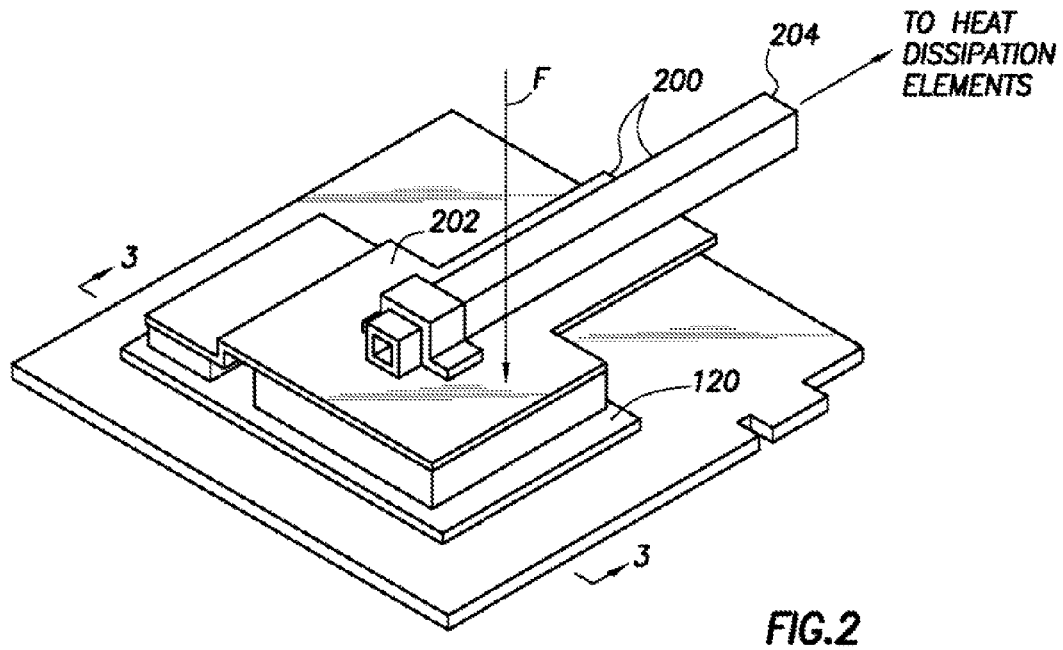
FIG. 2 shows a perspective view of an assembled system in accordance with at least some embodiments.

FIG. 2 shows a perspective view of the system with the carrier device 120 in mating relationship with the underlying electronic components (not visible), and a metallic member 200 coupled thereon. In particular, the metallic member 200 is configured to thermally conduct heat away from the electronic components to other devices which dissipate the heat, such as cooling fins and one or more fans. The metallic member 200 may apply a predetermined amount of downward force (as showed by arrow F) to ensure proper thermal coupling. The mechanism by which the compressive force is applied is not shown so as not to unduly complicate the description. Any mechanism to apply an appropriate amount of compressive force, which may be both a function of the thermal interface materials and the electronic components, may be used. Moreover, FIG. 2 shows that, in accordance with at least some embodiments, an attachment portion 202 of the metallic member 200 has non-uniform elevations, which non-uniform elevations may assist in thermally coupling to the underlying electronic components. In operation, heat generated by the electronic components is conducted through respective thermal interface material and apertures to the attachment portion 202. The heat is then thermally conducted along the metallic member 200, such as by way of tubing portion 204, to other devices for dissipation of the heat.

Figure 3:
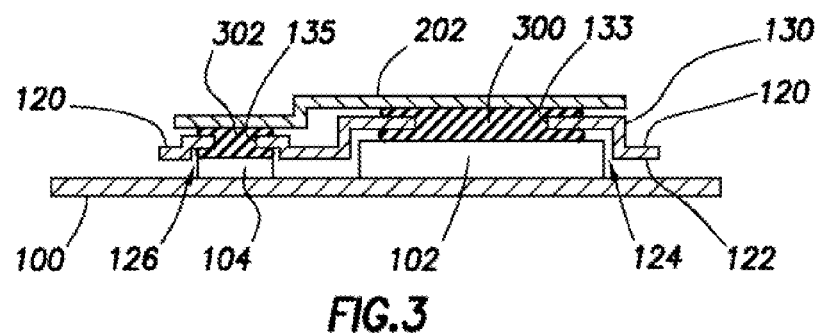
FIG. 3 shows a cross-section elevation view of a system taken substantially along line 3-3 of FIG. 2, in accordance with at least some embodiments.

FIG. 3 shows a cross-section elevation view of the system of FIG. 2 taken substantially along line 3-3 of FIG. 2. In particular, FIG. 3 shows the underlying structure 100 along with electronic components 102 and 104. FIG. 3 further shows carrier device 120 telescoped at least partially over the illustrative electronic components 102 and 104. Above the carrier device 120 is the attachment portion 202 of the metallic member 200 (FIG. 2). The cross-section of FIG. 3 illustrates the non-uniform attachment portion 202, in accordance with at least some embodiments, which non-uniform attachment portion 202 may be occasioned by differences in height of the electronic components 102 and 104. Also shown are the apertures in each respective quadrilateral areas. In particular, illustrative quadrilateral area 124 has aperture 133, and illustrative quadrilateral area 126 has aperture 135. Between the electronic component 102 and the attachment portion 202 is a thermal interface material 300. Likewise, between the electronic component 104 and the attachment portion 202 is a thermal interface material 302. The thermal interface materials may be any suitable thermal interface material, such as thermally conductive grease, thermally conductive pads or sheets, or thermally conductive phase change materials. As illustrated in FIG. 3, the thermally conductive materials 300 and 302 may migrate slightly around the periphery of their respective apertures as cause by compressive force applied to the assembly.

The carrier device 120 of FIG. 3 is illustrative of a rigid carrier device created in a vacuum forming processing. When creating the carrier device 120 in a vacuum forming processing, the thickness of the material (e.g., polycarbonate) that forms the carrier device may be on the order of 0.5 millimeters (mm) to 1.0 mm. Moreover, regardless of the material used to form the carrier device, the material is selected to remain rigid at expected operating temperatures of the electronic components, even if higher temperatures are used in the forming processes. For example, the material selected should remain rigid at temperatures at or below 100 degrees Celsius.

Figure 4:
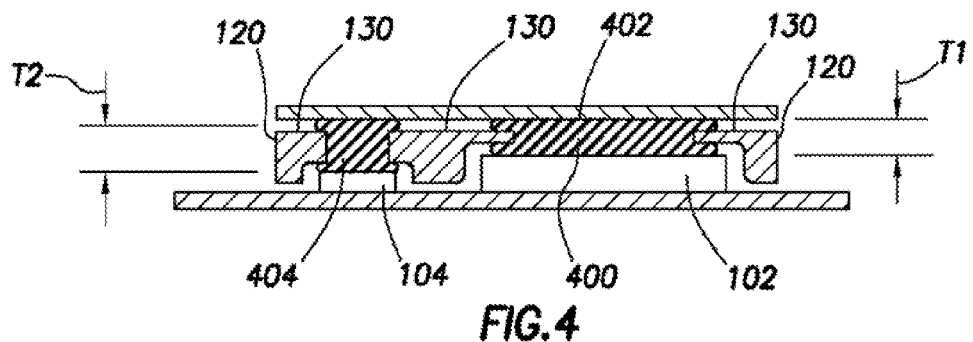
FIG. 4 shows a cross-section elevation view in accordance with at least some embodiments.

Using the illustrative vacuum forming, while the inner surface 122 takes the negative form of the electronic components, the outer surface 130 takes the overall shape of the various electronic components. However, as mentioned above the carrier device 120 need not be vacuum formed, and instead may be created by illustrative injection molding processes, computer-controlled milling, and die stamping. FIG. 4 shows a cross-section elevation similar to FIG. 3, except in the illustrative embodiments of FIG. 4 the carrier device 120 has a substantially planer (i.e., uniform) outer surface 130. The illustrative carrier device 120 of FIG. 4 may be created, for example, by injection molding into a mold that defines the planer outer surface 130, or by computer controlled milling. Moreover, the illustrative carrier device of FIG. 4 may also be created by vacuum forming of a relative thick material, then milling of the outer surface 130 to achieve the uniform nature.

FIG. 4 also illustrates that a carrier device 120 may be associated with thermal interface materials of different thicknesses in each quadrilateral area. In particular, the thermal interface material 400 between the electronic component 102 and the attachment portion 400 has a particular thickness "T1." Similarly, the thermal interface material 404 between the electronic component 104 and the attachment portion 402 has a thickness "T2", with T2 being greater than T1. FIG. 4 shows the thermal interface material in a compressed orientation, but it follows that the thermal interface materials 400 and 404 have different thicknesses in their uncompressed state when coupled to the carrier device 120 prior to the carrier device 120 being placed in mating relationship with the electronic components and the attachment portion.

Figure 5:
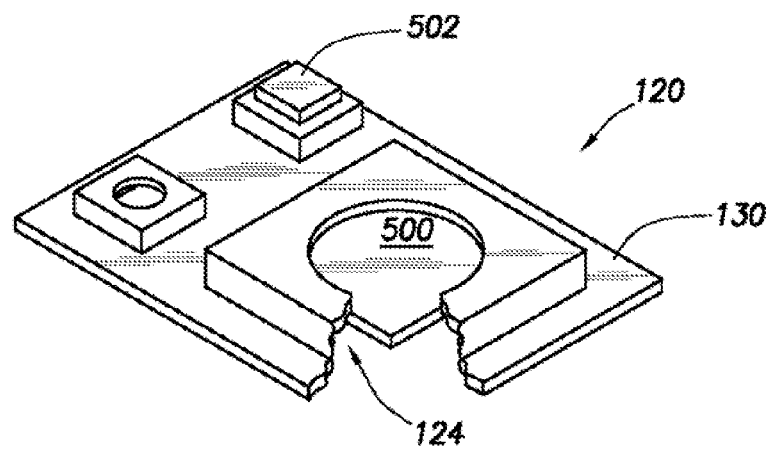
FIG. 5 shows a partial cut-away perspective view of a carrier device in accordance with at least some embodiments.

FIG. 5 illustrates a carrier device 120 in accordance with at least some embodiments after coupling of the thermal interface materials, but prior to the carrier device being mated with electronic components. In particular, in the perspective view of FIG. 5 the outer surface 130 is shown. In the particular example of FIG. 5, the locations of the quadrilateral areas are visible on the outer surface 130, such as situations where the carrier device 120 is created in a vacuum forming process. FIG. 5 is also a partial cut-away view to illustrate a thermal interface material portion 500 coupled to the inner surface of the carrier device within the quadrilateral area 124. FIG. 5 also illustrates that the thermal interface material portions need not initially couple within the quadrilateral areas, and instead may be coupled to the outer surface 130, as illustrated by thermal interface material portion 502. Whether the thermal interface material is initially coupled on the inner surface or the outer surface, the compressive force applied by the attachment portion of the metal member forces the thermal interface material through the apertures associated with their respective quadrilateral areas to thermally couple to both the electronic component and the attachment portion of the metallic member.

Figure 6:
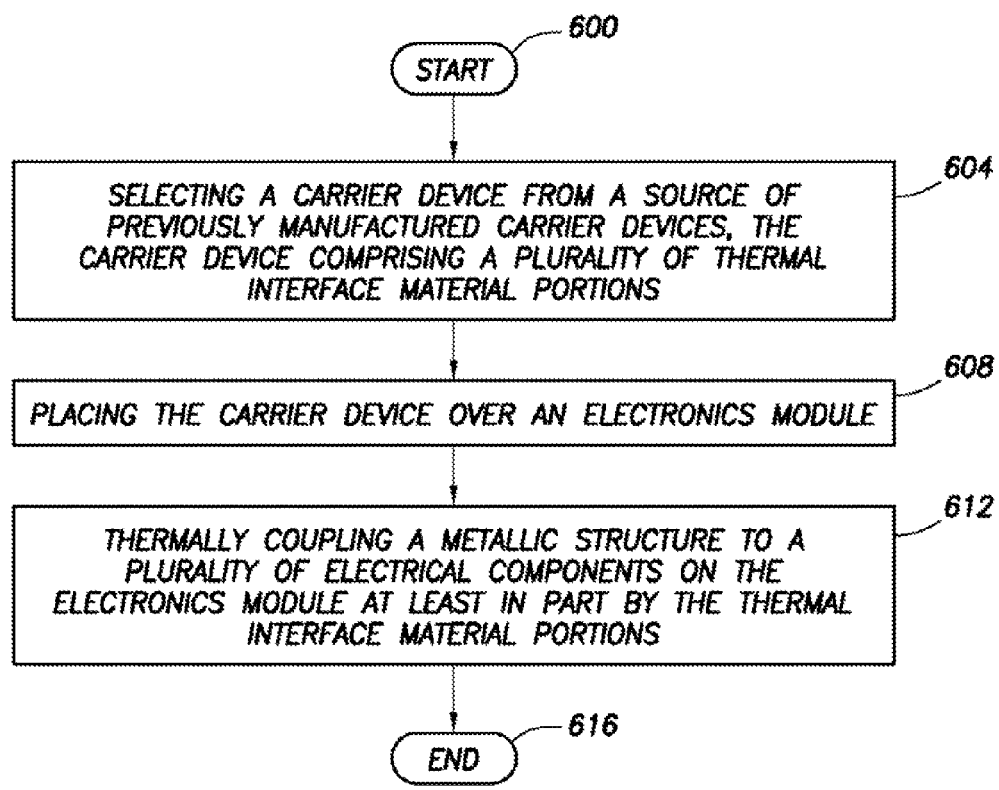
FIG. 6 shows a method in accordance with at least some embodiments.

FIG. 6 illustrates a method in accordance with at least some embodiments. In particular, the method starts (block 600) and proceeds to selecting a carrier device from a source of previously manufactured carrier devices, the carrier device comprising a plurality of thermal interface material portions (block 604). For example, a human responsible for assembly of computer systems may select a carrier device from a bin of pre-constructed carrier devices. In other embodiments, a robotic system may acquire a carrier device from a source of pre-constructed carrier devices. Next, the carrier device is placed over an electronics module (block 608). For example, the human may manually place the carrier device, or the robotic system may place the carrier device. Thereafter, a metallic structure is thermally coupled to a plurality of electrical components on the electronics module at least in part by the thermal interface material portions (block 612), and the method ends (block 616). In some cases, merely placing the metallic member on the carrier device alone may be sufficient to thermally couple, but in other cases a compressive force may be applied to ensure proper thermal coupling.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
   a first electrical component that defines a first surface at a first elevation relative to an underlying structure;
   a second electrical component that defines a second surface at a second elevation relative to the underlying structure, the second elevation different than the first elevation;
   a metallic member configured to conduct heat away from the electrical components, wherein the metallic member includes a top side and a bottom side, wherein the bottom side includes a third surface at a third elevation relative to the underlying structure and a fourth surface at a fourth elevation relative to the underlying structure, the fourth elevation different than the third elevation;
   a carrier between the electrical components and the metallic member, the carrier comprising:
      a fifth and a sixth surface configured to mate with the first and second surfaces, respectively;
      a first aperture through the fifth surface; and
      a second aperture through the sixth surface;
   a first thermal interface material engaged between the first electrical component and the third surface of the metallic member through the first aperture, and a second thermal interface material engaged between the second electrical component and the fourth surface of the metallic member through the second aperture.

2. The system of claim 1 wherein the carrier is polycarbonate.

3. The system of claim 1 wherein the first electrical component is a processing unit.

4. The system of claim 1 wherein the carrier is rigid at temperatures below 100 degrees Celsius.

5. A structure comprising:
   a rigid material that defines an outer surface and an inner surface opposite the outer surface;
   a first quadrilateral area defined by the rigid material, the first quadrilateral area defining a first plane on the inner surface and a second plane on the outer surface;
   a second quadrilateral area defined by the rigid material, the second quadrilateral area defining a third plane on the inner surface and a fourth plane on the outer surface, the first and third planes being parallel but not co-planar, and the second and fourth planes being parallel but not co-planar;
   a first aperture between the first and second planes through the first quadrilateral area; and
   a second aperture between the third and fourth planes through the second quadrilateral area.

6. The structure of claim 5 wherein the inner surface is an at least partial negative impression of heat generating components of an electronics device.

7. The structure of claim 5 wherein the inner surface is an at least partial negative impression of a graphics module for a computer system.

8. The structure of claim 5 wherein the rigid material is polycarbonate.

9. The structure of claim 5 wherein at least a portion of the outer surface opposite the first and second quadrilateral areas is flat.

10. A method comprising:
    selecting a carrier device from a source of previously manufactured carrier devices, the carrier device comprising:
       a rigid material that defines an outer surface and an inner surface opposite the outer surface;
       a first quadrilateral area defined by the rigid material, the first quadrilateral area defining a first lane on the inner surface and a second plane on the outer surface;
       a second quadrilateral area defined by the rigid material, the second quadrilateral area defining a third plane on the inner surface and a fourth plane on the outer surface, the first and third planes being parallel but not co-planar, and the second and fourth planes being parallel but not co-planar;

a first aperture between the first and second planes through the first quadrilateral area;

a second aperture between the third and fourth planes through the second quadrilateral area;

placing the carrier device over an electronics module;

thermally coupling a metallic structure to a first electrical component on the electronics module through a first thermal interface material disposed within the first aperture; and thermally coupling the metallic structure to a second electrical component on the electronics module through a second thermal interface material disposed within the second aperture.

11. The method of claim 10 wherein placing the carrier further comprises placing the carrier wherein the inner surface is at least a partial negative impression of the first electrical component and the second electrical component of the electronics module.

12. The method of claim 10 wherein placing the carrier further comprises placing the carrier wherein the second plane and the fourth plane are flat.

13. The method of claim 10 wherein placing the carrier device further comprises placing a carrier device whose shape is created in a vacuum forming processing prior to placing.

14. The system of claim 1, wherein the carrier further comprises:

a seventh surface at a seventh elevation;

an eighth surface at an eighth elevation that is different than the seventh elevation;

wherein the first aperture extends through the seventh surface and the second aperture extends through the eighth surface; and wherein the seventh surface is proximate the third surface and the eighth surface is proximate the fourth surface.

* * * * *

UNITED STATES PATENT AND TRADEMARK OFFICE
CERTIFICATE OF CORRECTION

PATENT NO.         : 8,576,566 B2                                              Page 1 of 1
APPLICATION NO.    : 13/140832
DATED              : November 5, 2013
INVENTOR(S)        : Jeffrey A. Lev et al.

It is certified that error appears in the above-identified patent and that said Letters Patent is hereby corrected as shown below:

In the Claims:

In column 6, line 63, in Claim 10, delete "lane" and insert -- plane --, therefor.

Signed and Sealed this
Twenty-eighth Day of January, 2014

Michelle K. Lee
*Deputy Director of the United States Patent and Trademark Office*